(12) United States Patent  (10) Patent No.: US 8,092,113 B2
Penzkofer  (45) Date of Patent: Jan. 10, 2012

(54) CANTILEVER PLATE CONNECTION ARRANGEMENT

(75) Inventor: Ludwig Penzkofer, Leiblfing (DE)

(73) Assignee: Max Frank GmbH & Co. KG, Leiblfing (DE)

( * ) Notice: Subject to any disclaimer, the term of this patent is extended or adjusted under 35 U.S.C. 154(b) by 941 days.

(21) Appl. No.: 11/587,894

(22) PCT Filed: Apr. 28, 2005

(86) PCT No.: PCT/EP2005/004582
§ 371 (c)(1),
(2), (4) Date: Oct. 27, 2006

(87) PCT Pub. No.: WO2005/106144
PCT Pub. Date: Nov. 10, 2005

(65) Prior Publication Data
US 2007/0227093 A1  Oct. 4, 2007

(30) Foreign Application Priority Data
Apr. 28, 2004 (DE) .......................... 10 2004 020 914

(51) Int. Cl.
*F16B 9/00* (2006.01)
(52) U.S. Cl. .................... 403/240; 403/292; 403/294
(58) Field of Classification Search ................ 403/240, 403/292, 294; 404/47, 59, 60; 52/396.02, 52/583.1
See application file for complete search history.

(56) References Cited

U.S. PATENT DOCUMENTS

| | | | | |
|---|---|---|---|---|
| 2,181,005 A | * | 11/1939 | Westcott | 404/60 |
| 2,203,078 A | * | 6/1940 | Carter | 404/47 |
| 2,208,454 A | * | 7/1940 | Geyer et al. | 404/60 |
| 2,305,979 A | * | 12/1942 | Mitchell | 404/59 |
| 2,308,677 A | * | 1/1943 | Dailey | 404/60 |
| 2,319,713 A | * | 5/1943 | Williams | 404/60 |
| 2,482,836 A | * | 9/1949 | Brickman et al. | 404/47 |
| 2,531,040 A | * | 11/1950 | Heltzel | 404/59 |
| 4,959,940 A | | 10/1990 | Witschi | 52/583 |
| 5,586,834 A | * | 12/1996 | Tsuji | 404/60 |
| 5,674,028 A | * | 10/1997 | Norin | 404/60 |
| 6,517,277 B2 | * | 2/2003 | Hu et al. | 403/294 |

FOREIGN PATENT DOCUMENTS

| | | |
|---|---|---|
| DE | 3 005 571 | 6/1981 |
| DE | 34 26 538 | 1/1985 |
| DE | 4009987 C2 | 10/1991 |
| DE | 19508292 A1 | 9/1996 |
| DE | 19508292 U1 | 9/1996 |
| DE | 19627342 A1 | 1/1998 |
| DE | 20010770 U1 | 9/2000 |
| DE | 10102930 A1 | 7/2002 |
| EP | 117 897 A1 | 9/1983 |
| EP | 388 692 A1 | 3/1990 |
| EP | 1225283 A1 | 1/1998 |
| EP | 1158114 A2 * | 11/2001 |
| EP | 1 225 282 | 7/2002 |
| EP | 1 229 176 | 8/2002 |
| EP | 121 685 A2 | 2/2004 |
| GB | 2185046 A * | 7/1987 |

* cited by examiner

*Primary Examiner* — Victor MacArthur

(74) *Attorney, Agent, or Firm* — Niky Economy Syrengelas, Esq.; Crockett & Crockett, PC

(57) ABSTRACT

A cantilever plate connection element (1) for connecting a floor/ceiling plate.

27 Claims, 12 Drawing Sheets

CANTILEVER PLATE CONNECTION ARRANGEMENT

TECHNICAL AREA

The present invention relates to a cantilever panel connecting element for connecting a ceiling/floor panel and a cantilever panel.

PRIOR ART

Cantilever panel connecting elements have been known for many years. For example, a cantilever panel connecting element with an elongated cuboid insulating body made from thermally insulating material is known from German Patent No. DE 3 005 571 B1. Elongated metal reinforcing elements pass through the insulating body, extending essentially perpendicularly to the insulating body, and are designed to absorb tractive forces. Besides these reinforcing elements, the cantilever panel connecting element is equipped with reinforcing steel rods for shearing forces and steel structural members that act as pressure elements.

In order to reduce costs, designs have also been suggested for cantilever panel connecting elements as a multi-part construction set that is assembled at the building site. Solutions of such kind are referred to in German Patent No. DE 34 26 538 A1, or European Patent Nos. EP 117 897 A1 and EP 388 692 A1, for example.

European Patent No. EP 121 685 A2 deals with pressure elements of cantilever panel connecting elements. In this case, the pressure elements have the form of rods that are embedded in both sides of the insulating body. The rods are so thin that they absorb or can follow the lengthwise movements caused by temperature changes perpendicularly to the pressure elements. However, this can lead to cracking of the concrete and fatigue fracturing in the area where the pressure elements are inserted in the cantilever panel or the ceiling/floor panel.

A cantilever panel connecting element with two abutting pressure elements is known from European Patent No. EP 1 229 176 A2. The two pressure elements are separated by a sliding bearing located in the insulating body. A sliding film or a sliding layer arranged between two panels serves as the sliding bearing. But particularly in the case of the sliding film, the problem arises that the sliding means loses its functional effect after the cantilever panel has undergone a certain number of thermal movements.

Finally, a structural element for heat insulation including an insulating body and pressure elements, in which the pressure elements are made of concrete and are manufactured by extrusion or casting, is known from European Patent No. EP 1 225 282 A2. The concrete pressure elements, which are manufactured using a casting mould, are incorporated in the structural element together with the mould. The mould then functions as the sliding layer, so that the pressure element is able to slide in response to the relative movements of the two adjacent concrete structural elements. According to EP 1 225 282 A2, this provides the particular advantage that the concrete pressure element is always lying flush with a flat, smooth outer surface of the adjacent concrete structural element, regardless of the concrete material that was poured into the respective casting mould.

However, there are also disadvantages associated with the solution suggested in EP 1 225 282 A2. It is generally known that the respective qualities of ceiling/floor panels and cantilever panels differ widely. Often, concrete of inferior quality is used, and consequently, particularly after a longer service life and when strong stresses are involved, the movements of the cantilever panel relative to the building may result in damage, and particularly in cracking of the concrete. The area around the interface between the pressure element and the ceiling/floor panel or the pressure element and the cantilever panel is particularly threatened in this case.

SUMMARY OF THE INVENTION

This is starting point for the present invention. The intention is to provide a cantilever panel connecting element that is able to absorb the thermally induced movements of the cantilever panel in such manner that the stress on the surrounding concrete of the ceiling/floor panel and of the cantilever panel is practically non-existent. This object is solved according to the invention with the cantilever panel connecting element as described in independent claim 1. Other advantageous features, details and designs of the invention are described in the dependent claims, the description, and the drawing.

Unlike the earlier solutions, the present invention does not use flat sliding surfaces that allow translatory movement of the cantilever panel, instead it uses articulation elements that respond to the thermally induced movements of the cantilever panel by pivoting. The invention is based on the idea that the movement of the pressure elements between two surfaces and relative to the adjacent concrete structural elements should include known components being of known quality.

The cantilever panel connecting element according to the invention joins a ceiling/floor panel and a cantilever panel. It is furnished with tractive means, shearing force means, pressure means, and a cuboid insulating body, wherein at least one pressure means is constructed as an articulation element that passes through the cuboid insulating body. The tractive means serve to absorb tractive forces, the shearing force means serve to absorb shearing or transverse forces, and the pressure means serve to absorb compression forces. The articulation element includes a main body, one end section facing the ceiling/floor panel, and one end section facing the cantilever panel. The main body is essentially enclosed in the cuboid insulating body, while the end sections protrude into the cantilever panel and the ceiling/floor panel when fitted. The surfaces of the two end sections of the articulation element each have a positive curvature in at least one direction, and at least one end section is furnished with sliding means. In accordance with the invention, the sliding means is a joint socket that is attached positively with the end section, the internal diameter of the joint socket being greater than the external diameter of the main body of the articulation element.

Thermal stress causes the cantilever panel to move relative to the ceiling-floor panel. In the absence of other measures, this movement may result in cracking and ultimately destruction of the beam. The cantilever panel end element according to the invention is furnished with articulation elements that absorb this relative movement with a pivoting movement of their own, thereby preventing the material from being exposed to excessively strong stresses. To enable this pivoting motion to take place without deforming the articulation elements, the concrete of the cantilever panel and of the ceiling/floor panel must not be attached to the articulation element in fixed manner. Only then is it possible to ensure that the respective concrete panel is able to move relative to the articulation element.

Concrete pressure elements that are manufactured using a casting mould are known from EP 1 225 282 A2 and are incorporated in the structural member together with the mould, in which case the mould acts as the sliding layer. Thus when heat causes the cantilever panel to expand, the pressure element moves together with the casting mould relative to the adjacent part of the building, i.e. relative to the ceiling/floor panel or the cantilever panel. The friction that this generates between the casting mould and the surrounding concrete can lead to fatigue cracks in the concrete.

To overcome this disadvantage, according to the present invention a joint socket is used that is in positive locking arrangement with the end section of articulation element, the internal diameter of the joint socket being greater than the external diameter of the main body of the articulation element. This allows the articulation element to move inside the socket joint, whereas the socket joint itself does not move relative to the surrounding concrete structural element. This substantially reduces the stress on the concrete of the cantilever panel and the ceiling/floor panel, which in turn greatly prolongs service life.

In the case of the concrete pressure elements manufactured using a casting mould as described in EP 1 225 282 A2, the internal diameter of the sliding means, i.e. the internal diameter of the casting mould, and the external diameter of the actual concrete pressure element are essentially the same. Of course, in mathematical terms, a extremely close examination reveals an infinitesimal difference between the two diameters, but for the purposes of the function of pressure element within the scope of the present invention, this difference is insignificant.

The positive locking design of the joint socket according to the present invention ensures that the pivoting motion of the articulation elements takes place in a defined direction. The term "positive locking" is here understood to mean that the contact surface of the joint socket for the articulation element has the same curvature as the corresponding end section of the articulation element.

In addition, the use of a joint socket establishes sliding conditions that are already defined, since the materials of the articulation element and the socket joint are known. On the other hand, if the concrete forms the socket joint, as in the solution suggested in EP 1 225 282 A2, the sliding properties of the socket joint are not known, because the consistency and quality of the concrete in this area have not been firmly defined.

A very small difference between the two diameters described is quite sufficient to obtain the advantages of the present invention. The difference needs only to be large enough to allow the articulating element to pivot without causing a change in the position of the socket joint. On the other hand, the difference between the diameters must not be too great, because this will allow the articulating element to make translatory movements relative to the socket joint as well, which will cause the articulating element to become misaligned or jammed.

According to a preferred embodiment of the present invention, the internal diameter of the socket joint is therefore 1% larger, preferably 2% larger, and particularly preferably 3% larger than the external diameter of the main body of the articulating element.

According to a further, particularly preferred embodiment of the present invention, the internal diameter of the socket joint is at least 5% larger, preferably 7% larger, and particularly preferably 10% larger than the external diameter of the main body of the articulating element.

According to a further preferred embodiment of the present invention, the internal diameter of the socket joint is at least 15% larger, and particularly preferably 25% larger than the external diameter of the main body of the articulating element.

The best results are obtained with pressure elements in which the internal diameter of the socket joint is between 6% and 9% larger than the external diameter of the main body of the articulating element.

Thermal stress causes the volume of the cantilever panel to change. Most of this expansion or shortening takes place in the direction of the main axis of the cantilever panel. The temperature fluctuations that take place in the narrower widths cause a concrete beam to expand several millimeters, generating significant compressive forces in the pressure rods. Thus for example a beam several meters long may expand horizontally by almost a centimeter, but vertically by mere fractions of a millimeter, and perhaps a few millimeters in extreme cases.

Accordingly, in their most general form the end sections of the articulating element according to the present invention have a positive curvature in one direction only. The articulating element is advantageously disposed so that the positive curvature of both end sections is aligned horizontally, i.e. in the direction of the greatest change of length of the cantilever panel. In this case, the articulating element is mirror-symmetrical about a plane of symmetry that is perpendicular to the main axis of the articulating element.

The radius of the circle describing the positive curvature of the end sections in the horizontal direction is preferably greater than half the diameter of the articulating element.

According to a further preferred embodiment of the present invention, the circle describing the positive curvature of the end sections in the horizontal direction merely represents an imaginary enclosure of the end sections. In the actual form, a notch is introduced in the middle of the end section. Such a notch stabilizes and locates the articulating element, because the notch defines the pivot point of the pivoting movement of the articulating element. The articulating element always pivots about the notch, thereby preventing the articulating element from drifting as a result of its pivoting movement.

Since the cantilever panel is twisted slightly in the vertical direction as well, the end sections of the articulating element advantageously have positive curvatures in two directions. End sections that have a curve that is positive in the vertical direction as well also have advantages with respect to the shearing forces which will be described in the following.

The radius of the circle describing the positive curvature of the end sections in the vertical direction may generally be of any size, but it is preferably greater than half the longitudinal expansion of the articulating element.

Embodiments in which the curvatures of the end sections of the articulating elements are the same size in both directions are particularly preferred. In this case, the end sections of the articulating element have the shape of a spherical segment.

According to a further preferred embodiment of the present invention, both end sections of the articulating element are equipped with a sliding means. This in this case a further sliding means is provided in addition to the positive locking joint socket. This additional sliding means is preferably a coating that has a low coefficient of friction with concrete, thus enabling adjacent surfaces to slide over each other. According to a particularly preferred embodiment, this coating is a releasing agent that prevents adhesion between concrete and the end section of the articulating element.

It is particularly preferred to use two joint sockets that are in positive locking arrangement with the end sections of the articulating element. In this case, the articulating element pivots in defined manner relative to the cantilever panel and also relative to the ceiling/floor panel.

In order to minimize the friction between the articulating element and the socket joint as far as possible, according to a particularly preferred embodiment of the present invention the end sections of the articulating element that are furnished with a positive locking socket joint are provided with a coating that has a low coefficient of friction with the material of the socket joints.

It should also be noted at this point that of course friction with both the concrete and the socket joint is further reduced if the surface of the end sections of the articulating element are very smooth, and a particularly advantageous configuration of the present invention is realized.

The coatings on the articulating element mentioned in the preceding are usually applied by immersing the articulating element in the coating substance. In this process, a rubber ring is placed around the main body of the articulating element close to the respective end section, and this ensures that the free space the articulating element needs in order to pivot is maintained after it has been fitted in the insulating body. The rubber ring also serves as a seal and prevents concrete from getting between the articulating element and the insulating body.

According to a further particularly preferred embodiment of the present invention, the socket joint protrudes above the surface of the end section of the articulating element, at least in portions.

The portions that protrude above the surface of the end section of the articulating element are preferably shaped such they form a seal between the ceiling/floor panel and the cuboid insulating body or between the cantilever panel and the cuboid insulating body. Particularly preferred are socket joints in which the portions that protrude above surface of the articulating elements have a circumferential bulge. This bulge enables the socket joints to be fitted in the cantilever panel connecting element with a certain pre-stress. In this way, the joints between the insulating body and the main body of the articulating element have already been sealed before they come into contact with the concrete.

After fitting, the portions described are forced against the surface of the insulating body under the pressure of the concrete. This prevents concrete slurries from getting into the joint between the insulating body and the main body of the articulating element. If slurries got into the joint between the insulating body and the main body of the articulating element, the concrete surrounding the articulation point would cure to a form with very coarse grains, because the fine material that would have penetrated the joint and would be absent in this area. This impairs the quality of the concrete and accelerates ageing and/or entails a risk of breaking. When the joint is sealed by the socket joints as described above, the composition of the curing concrete remains unchanged, and the risk of breaking at these points is prevented.

According to a further particularly preferred embodiment of the present invention, an additional seal is provided to encircle the articulating element. This seal is a permanently elastic seal of the joint between the insulating body and the main body of the articulating element by bonding and caulking. This seal is made from an adhesive compound, wherein any type of adhesive compound having good adhesion properties with the material of the socket joint and good adhesion properties with the material of the articulating element may be used. For example, silicone adhesives may be used as well as polyurethane-based, 2-component adhesives. At the same time, a prefabricated sealing ring may be used as well as these adhesives.

The seals described provide even greater protection against concrete slurries getting into the joint between the insulating body and the main body of the articulating element. The also enable the socket joints to be bonded to the articulating element by the adhesive seals. This elastic bond between the socket joint and the articulating element is preserved even during relative movements occur between the cantilever panel and the floor/ceiling panel. Since the socket joint is permanently bonded to the surrounding concrete, the articulating element is still able to move freely relative to the socket joint.

According to a further particularly preferred embodiment of the present invention, two additional seals are provided to encircle the articulating element. In this case, one seal is adjacent the end section facing the ceiling/floor panel, and the other is adjacent to the end section facing the cantilever panel. In this way, the joint between the articulating element and the insulating body is sealed on both sides.

In order to enable the pivoting motion to take place in a defined manner, the concrete must be permanently bonded to the respective socket joint. In this case, the socket joint follows the movement of the concrete, i.e., the cantilever panel for example, and so moves relative to the articulating element. The pivoting motion of the articulating element is thus determined by the shape of the socket joint and the articulating element.

According to a particularly preferred embodiment of the present invention, the socket joint is therefore furnished with knob-like elevations at least in portions thereof, and these elevations protrude into the ceiling/floor panel and the cantilever panel. This creates a permanent connection between the socket joint and the concrete, so that the socket joint is able to move together with the concrete relative to the articulating element.

According to a further preferred embodiment of the present invention, the knob-like elevations are hollow on the side facing the end section of the articulating element. A reservoir of coating agent may be introduced into these depressions in the socket joint, thereby ensuring that the articulating joint continues to slide well in the socket joint for a longer time.

According to a further particularly preferred embodiment of the present invention, the portions of the socket joint that protrude above the surface of the end section as described above are shaped such that they are enclosed in portions of the ceiling/floor panel or the cantilever panel. This serves to further reinforce the connection between the socket joint and the concrete, thus preventing the socket joint from moving relative to the concrete.

The socket joints are preferably constructed from sheet metal, teflon, aluminum, stainless steel, a teflon-coated sheet metal, a film, particularly a plastic film, and/or a teflon-coated film. In general, the material of the socket joint may be self-supporting or it may be a flexible material that is pressed into the shape of a socket joint by the concrete. In all cases, the material used for the socket joints should be exceptionally durable and also have a low coefficient of friction with the material of the articulating element.

In general, the main body of the articulating element may be of any shape. It is preferably cuboid or cylindrical in shape. In particular, the diameter of the main body may be varied at will in order to adapt it to the prevailing static conditions in a wide range.

The strong compressive force that acts on the articulating element when it is fitted should be transferred to the surrounding material as evenly as possible. This is ensured particularly conveniently if the main body of the articulating element has a cylindrical shape, because then the force is transferred in radially symmetrical manner. If surfaces are flattened, the forces are not transferred evenly, and this may cause the articulating element to break. Therefore, the main body of the articulating element is particularly preferably cylindrical, and thus also has a circular cross-section.

It should be noted at this point that the articulating elements function as pressure elements according to the present invention and are fitted in the cantilever panel connecting element in known manner, as close as possible to the underside of the cantilever panel. The pressure elements serve to absorb the turning moment that is exerted on the ceiling/floor panel by the cantilever panel. Accordingly, the greatest possible vertical distance should be maintained between the tension rods and the pressure elements. The larger this distance, the greater the forces that the tension rods and pressure elements are able to absorb.

At the same time, in all cases the articulating elements functioning as pressure elements must be fitted above the steel reinforcement for the ceiling/floor panel, because otherwise the concrete may easily fail in the transition area between the ceiling/floor panel and the cantilever panel. To achieve the most favorable compromise between these to conflicting requirements, the surface of the main body of the articulating element according to the present invention that faces the underside of the cantilever panel is preferably flattened. This shape allows the articulating element to be positioned as close as possible to the underside of the cantilever panel. For example, if the shape is flattened by 5 mm the articulating element may be fitted 3 mm lower. According to a preferred embodiment of the present invention, the cross-section of the main body of the articulating element is therefore essentially a segment of a circle.

According to a further preferred embodiment of the present invention, the cross-section of the main body of the articulating element is essentially a rectangular, one side of the rectangle having been replaced with a segment of a circle. This embodiment, like the construction of the articulating element from several sub-elements that will be described later, provides a number of advantages with in terms of absorbing shearing forces.

In the cases described, in which the cross-section of the main body of the articulating element is not circular, the socket joint is furnished with a corresponding, positive locking depression. For example, if the cross section of the articulating element is a segment of a circle, the side of the socket joint facing the articulating element is furnished with a depression that matches the articulating element in terms of curvature and cross section. The straight portion of the segment prevents the articulating element from twisting axially.

Since the articulating element serves to convert the movement of the cantilever panel relative to the ceiling/floor panel into a pivoting motion and also fulfils the function of a pressure element, according to a particularly preferred embodiment of the present invention the articulating element is made from an extremely rigid material, particularly fiber-reinforced concrete or ceramic.

Despite the measures described, it is an oversimplification to consider that the movement of the articulating element along its contact surfaces with the concrete is one of sliding, at least at the start of such a movement. As was noted earlier, when fitted the articulating element is subjected to very high pressure. Accordingly, when relative movement occurs between the cantilever panel and the building, a breakaway torque must first be overcome. A sliding movement of the articulating element is not possible until the contact surfaces between the articulating element and the concrete or between the articulating element and the socket joint have broken away from each other.

When relative movement between the cantilever panel and the building occurs, before the breakaway torque is overcome enormous shearing forces are created along a diagonal in the direction of longitudinal expansion of the articulating element. In severe cases, these shearing forces are capable of destroying the articulating element. In order to overcome this problem, a preferred embodiment of the articulating element according to the invention is constructed from at least two sub-elements that are attached to each other in positive locking manner, and which contact one another via a contact plane.

The shearing forces that arise may be absorbed by the articulating element in particularly advantageous manner if the sub-elements are each able to move relative to each other in the direction of the shearing forces. Accordingly, it is particularly preferred if the sub-elements are essentially identical and if their contact plane includes the longitudinal axis of the main body of the articulating element. In this case, the main body of the articulating element is constructed from two semicylinders. When shearing forces are exerted along the main axis of the articulating element, these two semicylinders may be displaced relative to each other, thus absorbing the shearing forces without suffering any damage. This effect is particularly evident if the contact plane is perpendicular to the plane of the cantilever panel.

According to a further particularly preferred embodiment of the present invention, the articulating element is constructed from four essentially identical sub-elements, wherein two pairs of sub-elements have a shared contact plane. The two contact planes intersect each other along the longitudinal axis of the main body of the articulating element. Thus with reference to the main body of the articulating element, they are four quarter cylinders. This configuration also solves another problem associated with fitting the cantilever panel connecting elements according to the invention. When the cantilever panel has been concreted and the mould has been removed, the reinforcement sinks under the effects of gravity, until it reaches its resting position. This causes the cantilever panel to move until the tension rods and the pressure elements of the cantilever panel connecting element absorb the driving forces. The net result is that the cantilever panel slightly tilted vertically thereby, and the degree of this tilting increases as a function of the distance from the ceiling/floor panel.

According to a preferred embodiment of the present invention, the surfaces of the sub-elements that are in contact with one another are furnished with a sliding means. This sliding means may be a coating, preferably a teflon coating, that enables the contacting surfaces to slide over each other easily. In this context, separating agents that neutralize any adhesive bond between the sub-elements of the articulating joint are particularly preferred.

The elongated, cuboid insulating body is constructed from heat insulating materials, preferably from mineral materials, particularly from glass wool or mineral wool. However, it is entirely possible to produce the insulating body from polystyrene foam as well.

The insulating body normally incorporates tension rods 27 and transverse rods 28 that are known from the related art for cantilever panel connecting elements. The tension rods may also be tension rod supports to which the actual tension rods may be attached. The tension rods absorb the tractive forces that act horizontally, while the transverse rods are responsible for the vertical shearing forces.

According to a preferred embodiment of the present invention, the socket joints are embedded in the cantilever panel connecting element together with the articulating elements.

In general, the socket joints may be fixed to the articulating elements by any method. In particular, the socket joints may be bonded to the articulating elements adhesively. In this case, the adhesive may also serve as a lubricant. However, securing with cable ties, wiring in similar manner to a champagne cork, bolting, or riveting are also conceivable. In these cases, the end sections of the articulating elements is furnished with a corresponding cutout. The socket joints may also be fixed on the articulating elements via the seal described previously that encircles the articulating element between the articulating element and the insulating body.

This embodiment is produced particularly simply if a rubber band is used to secure the socket joints to the articulating elements. If the rubber band is sufficiently prestressed, the socket joints are held firmly against the insulating body, thus sealing the joint between the articulating element and the insulating body before concreting takes place.

Accordingly, in a further preferred embodiment the articulating element has a central borehole in the direction of its main axis. A rubber band with ends attached to the socket joints is passed through this borehole. The effect of this is to press the socket joints against the articulating element.

The attachment of the socket joint to the articulating element only seems to impede the movement of the articulating element in the socket joint relative movement of the cantilever panel occurs. The forces that arise during such relative movements are greater by orders of magnitude than the force with which the socket joint is attached to the articulating element. All the fixing means described above merely serve to make it easier to position and fit the cantilever panel connecting elements according to the invention. As soon as relative movement of the cantilever panel occurs, the fixing means are destroyed or deformed immediately and the articulating element is able to move in the manner described inside the socket joint.

Of course the present invention also extends to cantilever panel connecting elements with cutouts that are provided to accommodate the articulating elements. These cutouts are advantageously not created centrally in the insulating body, but relatively close to the edge that is to be matched with the underside of the cantilever panel.

Although the socket joints may be very thin, to substantially reduce friction, is has proven advantageous to make the socket joints so thick that they form an additional insulating element. The insulation values of plastic are significantly greater than those of concrete or metal.

The cantilever panel connecting element according to the invention is significantly less expensive to manufacture than the other current solutions. Production of the pressure elements by extrusion moulding, cutting and grinding allows a wide range shape variants to be produced. Compared with the pressure rods that are otherwise in common use, or pressure elements with a different design, the articulating elements made of reinforced-reinforced concrete or ceramic described here are much lighter. As a consequence, they require less effort to move and to store. To this are added substantial savings in metal and transport costs. But besides these cost-saving effects, the transfer of forces is also improved considerably. The movements are effected not via deformation of pressure rods, but via a pivoting motion of the articulating element. Correspondingly fewer failures occur and an improved element is obtained that responds to the movements and guarantees a longer operating life while reducing costs.

BRIEF DESCRIPTION OF THE DRAWING

In the following, the invention will be described in greater detail with reference to embodiments and in conjunction with the drawing. In the drawing.

DETAILED DESCRIPTION OF THE INVENTION

Figure 1:
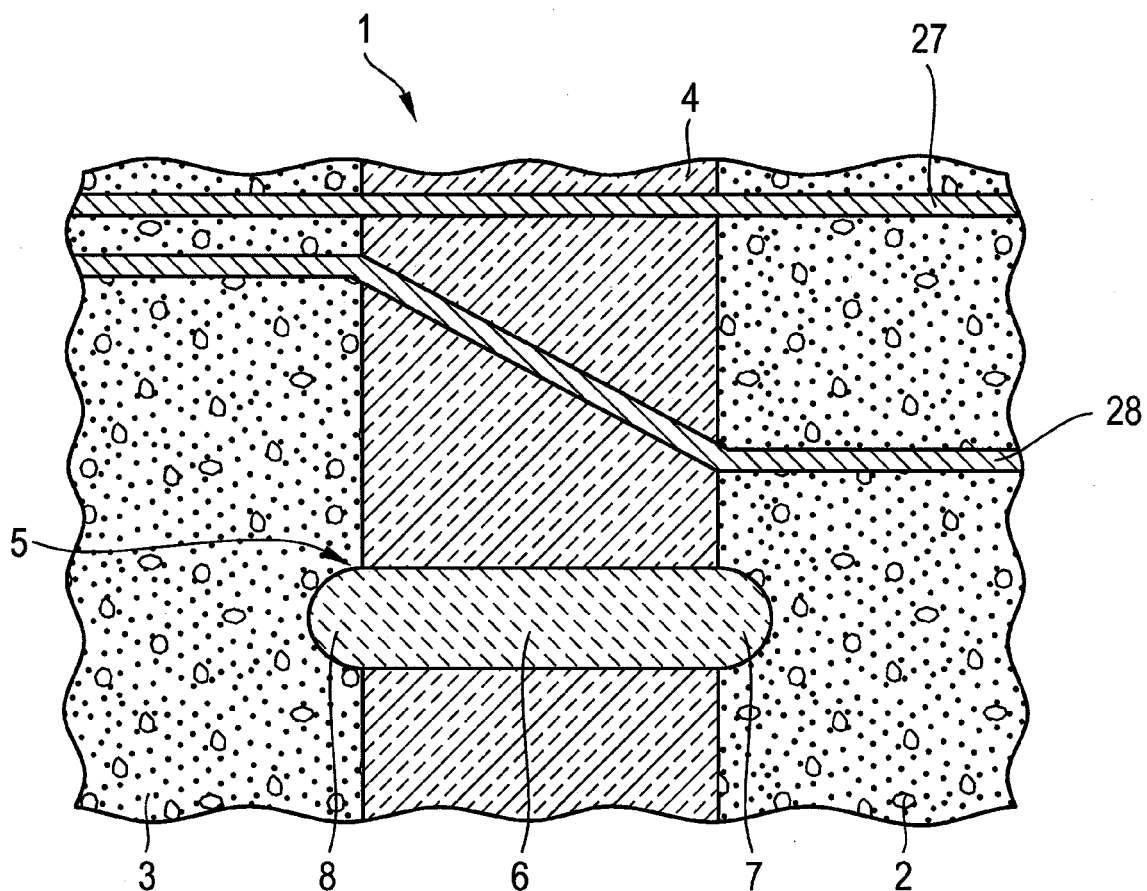
FIG. 1 is a cross section through a cantilever panel connecting element of the present invention with articulating element along the main axis of the articulating element.

FIG. 1 shows a cross section through a cantilever panel connecting element according to the present invention with an articulating element. Cantilever panel connecting element 1, which connects ceiling/floor panel 2 and cantilever panel 3, includes cuboid insulating body 4 and articulating element 5. Tension rods 27 and transverse rods 28 that are known from the related art for cantilever panel connecting elements normally pass through insulating body 4.

Articulating element 5 includes a main body 6, an end section 7 facing the ceiling/floor panel, and an end section 8 facing the cantilever panel. FIG. 1 shows that articulating element 5 passes through cuboid insulating element 4, so that the main body 6 of articulating element 5 is essentially surrounded by cuboid insulating body 4 and end sections 7, 8 protruded into cantilever panel 3 and ceiling/floor panel 2. The surfaces of end sections 7, 8 of articulating element 5 have a positive curvature in the direction of the main axis of cuboid insulating body 4.

Figure 2:
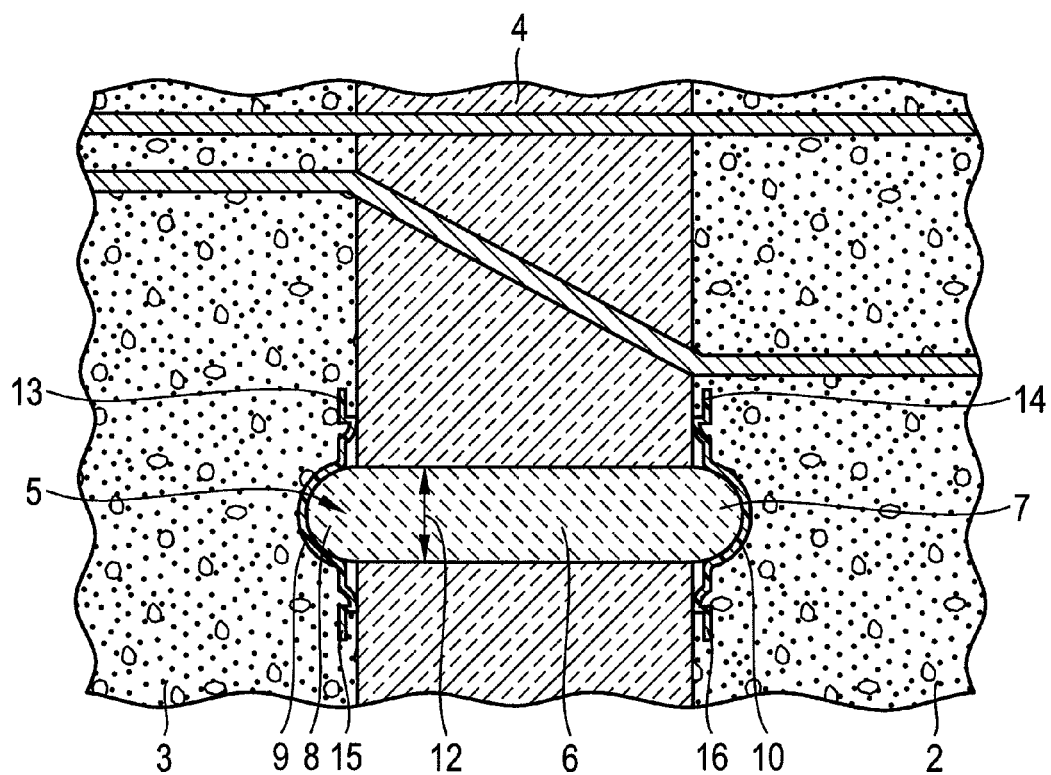
FIG. 2 is a cross section through a cantilever panel connecting element of the present invention with articulating element and socket joints along the main axis of the articulating element.

FIG. 2 also shows a portion of a cross section through a cantilever panel connecting element according to the present invention with an articulating element. This is the same cantilever panel connecting element as in FIG. 1, except that two socket joints 9, 10 are provided and are in positive locking connection with the end sections of the articulating element. In FIG. 2, spaces are shown between end sections 7, 8 and socket joints 9, 10 so that the individual elements may be identified more easily. In reality, however, these spaces are very small and when coatings are used as socket joints, they disappear altogether.

FIG. 2 also illustrates the fact that the socket joints may project above the surface of end sections 7, 8 of the articulating element, at least in portions 13, 14, 15, 16. Portions 13, 14, 15, 16 are forced against the surface of insulating body 4 by the pressure of the concrete. This prevents concrete slurries from getting into the joints between insulating body 4 and the main body 6 of articulating element 5. The concrete surrounding the articulating element is thus able to cure with no change in its composition, thereby preventing the risk of cracking at these points.

As shown in FIG. 2, the portions 13, 14, 15, 16 of the socket joints that protrude above the surface of end sections 7, 8 of the articulating element have a circumferential bulge. This bulge enables the socket joints to be fitted in the cantilever panel connecting element with a certain pretension. This in turn creates a seal for the joints between insulating body 4 and main body 6 of articulating element 5 even before the first contact with the concrete. The external diameter of the main body of the articulating element is designated with reference number 12.

Figure 3:
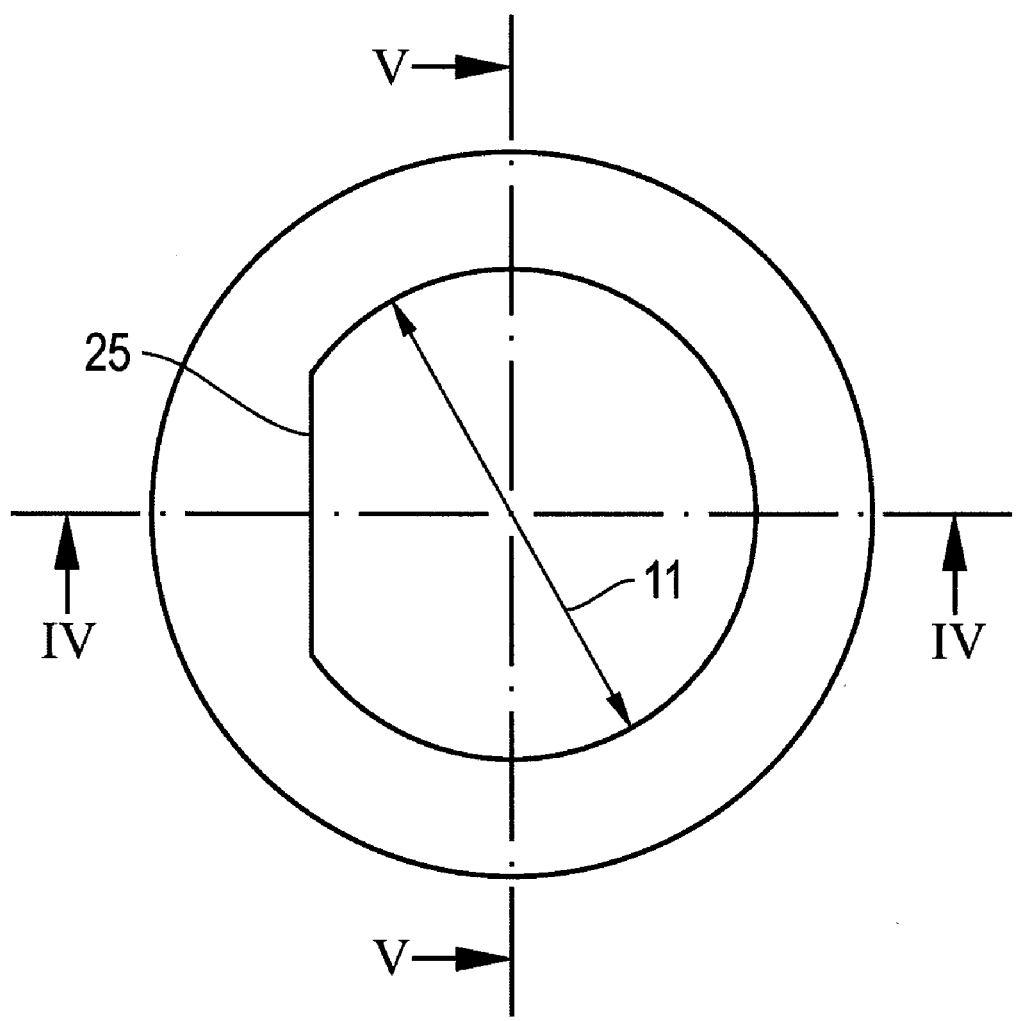
FIG. 3 is a plan view of a socket joint.

FIG. 3 is a schematic representation of a socket joint in plan view. It shows a socket joint that is used in conjunction with an articulating element, the main body of which has a cross section in the form of a circle segment. The side of the socket joint that faces the articulating element has a depression matching the articulating element in its curvature and cross section. Straight portion 25 of the circle segment prevents the articulating element from twisting axially. The internal diameter of the socket joint is designated with reference number 11.

The external diameter of the main body of the articulating element in FIG. 2 is 40 mm in the embodiment shown. The internal diameter of the socket joint of FIG. 3 is 43 mm in the embodiment shown, and accordingly is 7.5% larger than the external diameter of the main body of the articulating element.

Figure 4:
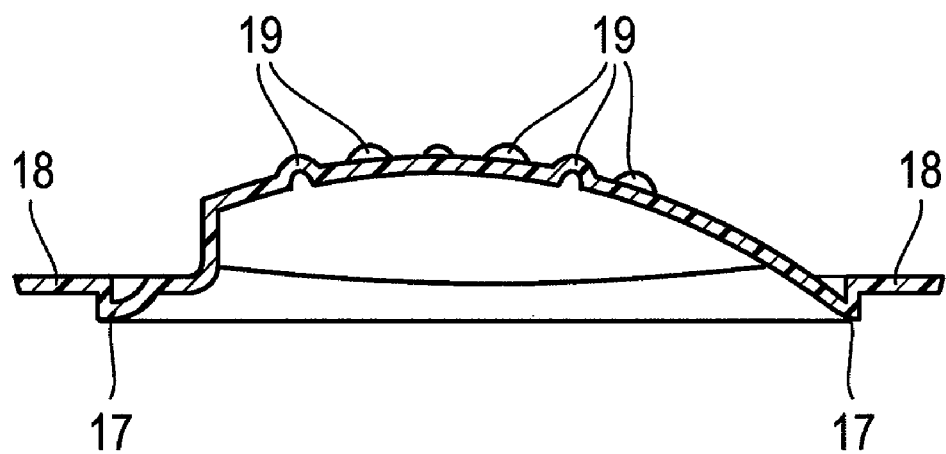
FIG. 4 is a section through the socket joint of FIG. 3 along line IV-IV.

FIG. 4 shows a section through the socket joint of FIG. 3 along line IV-IV. The portions 17 that protrude above the surface of the end section of the articulating element are visible, and are shaped such that they form a seal between the ceiling/floor panel and the cuboid insulating body, or between the cantilever panel and the cuboid insulating body. Beside them, portions 18 of the socket joint are also shown, and these are enclosed by the ceiling/floor panel or the cantilever panel. Knob-like elevations 19 protrude into the ceiling/floor panel and the cantilever panel.

Figure 5:
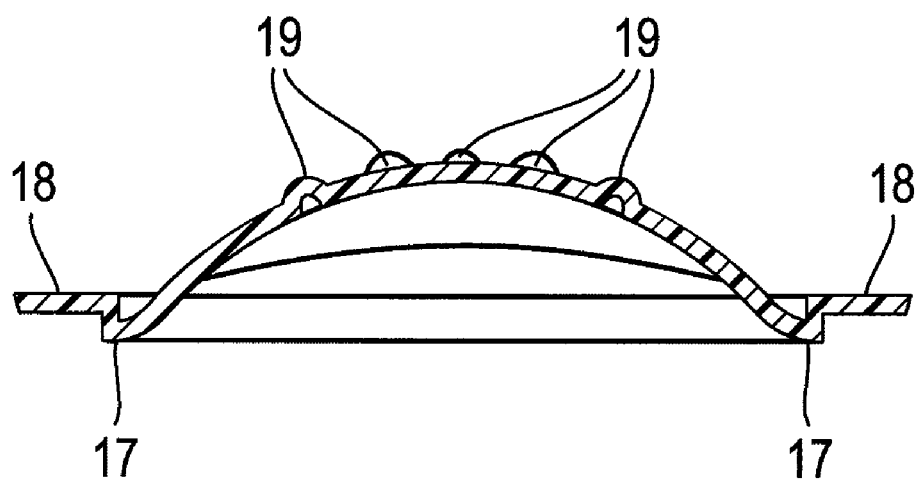
FIG. 5 is a section through the socket joint of FIG. 3 along line V-V.

FIG. 5 shows a section through the socket joint of FIG. 3 along line V-V. The portions 17 that protrude above the surface of the end section of the articulating element are visible, and are shaped such that they form a seal between the ceiling/floor panel and the cuboid insulating body, or between the cantilever panel and the cuboid insulating body. Beside them, portions 18 of the socket joint are also shown, and these are enclosed by the ceiling/floor panel or the cantilever panel. Knob-like elevations 19 protrude into the ceiling/floor panel and the cantilever panel.

A comparison of FIGS. 4 and 5 shows that the illustrated embodiment of a socket joint is curved differently in the vertical and the horizontal directions.

Figure 6A:
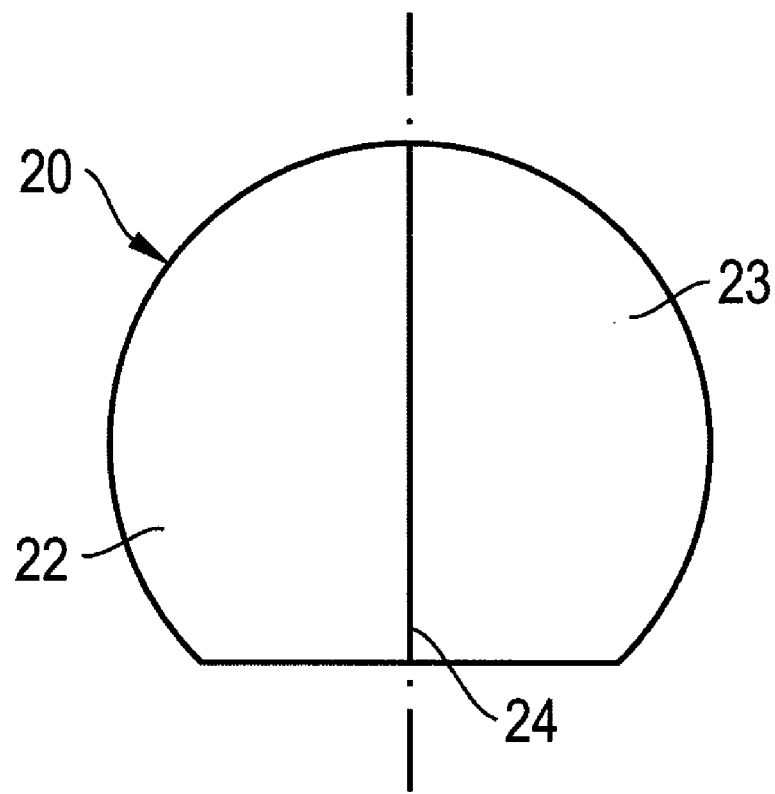
FIGS. 6A through 6D are various cross sections through four different articulating elements, perpendicular to the main axis of the articulating element in each case.
Figure 6B:
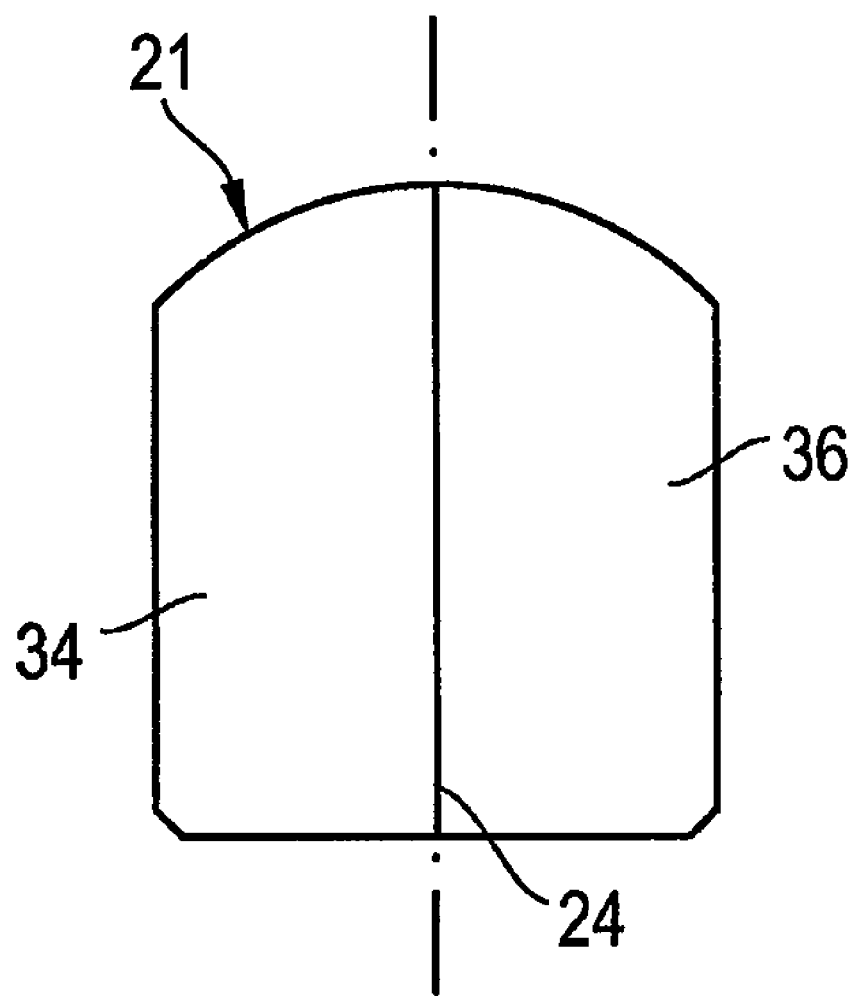
Figure 6C:
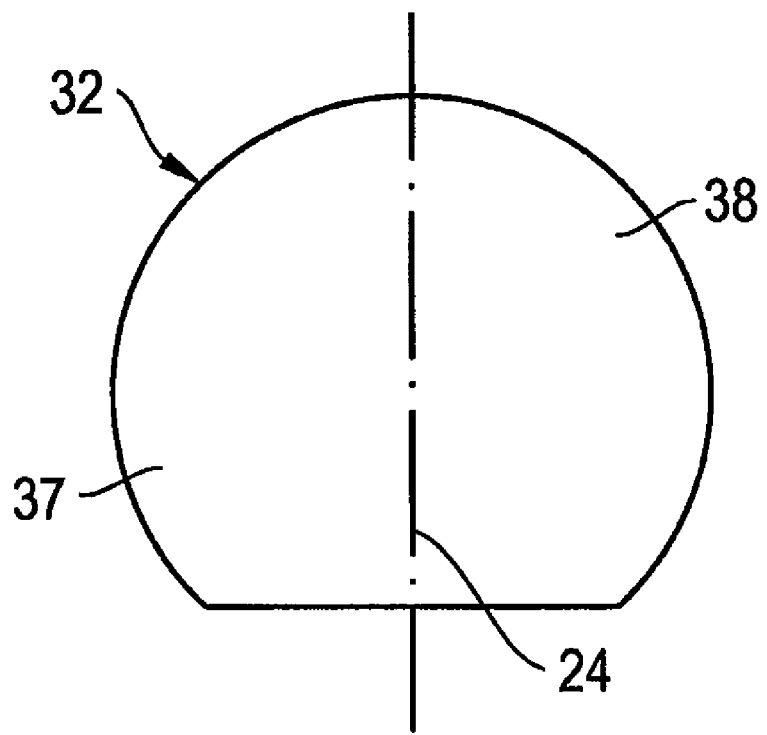
Figure 6D:
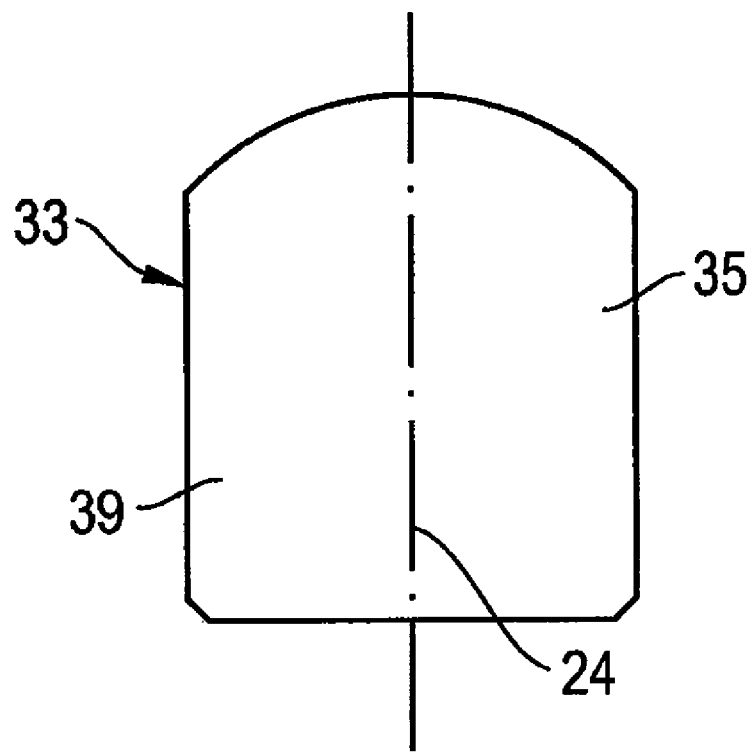

FIGS. 6A through 6D show various cross sections through four different articulating elements, perpendicularly to the main axis of the articulating element in each case. FIG. 6A illustrates a single-piece articulating element with a cross section in the form of a circle segment 20, Figure B illustrates a single-piece articulating element with an essentially rectangular cross section 21, wherein one side of the rectangle is replaced by a circle segment and the corners of the rectangular portion are chambered, FIG. 6c illustrates an articulating element constructed from two sub-elements 37, 38 with a cross section in the form of a circle segment 32, and FIG. 6D illustrates an articulating element constructed from two sub-elements 39, 35 with an essentially rectangular cross section 33, wherein one side of the rectangle is replaced by a circle segment and the corners of the rectangular portion are chambered. The two sub-elements 39, 35 are in contact with one another via contact plane 24.

Figure 7:
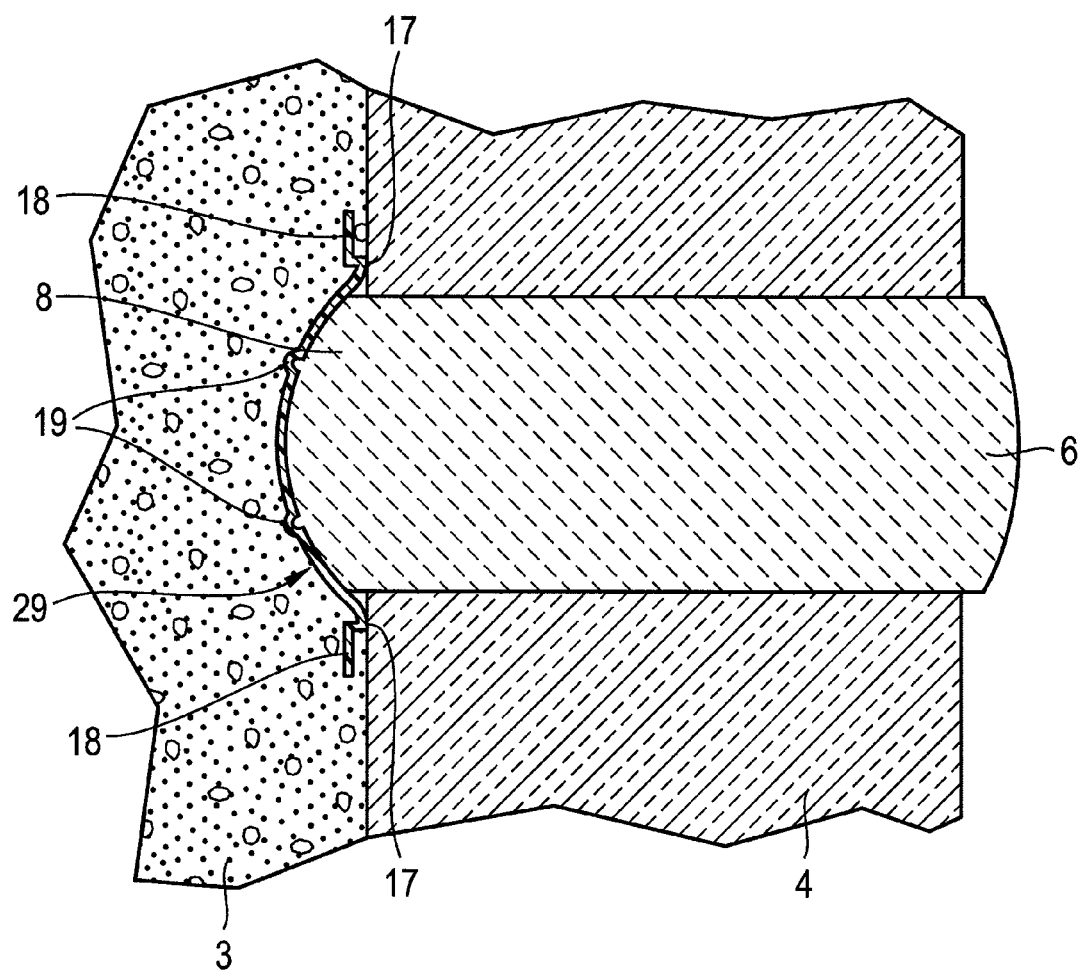
FIG. 7 is a cross section through a cantilever panel connecting element of the present invention with articulating element and socket joint horizontally along the main axis of the articulating element.

FIG. 7 shows a cross section through a cantilever panel connecting element of the present invention with articulating element and socket joint horizontally along the main axis of the articulating element. The illustrated part of the articulating element includes main body 6 and end section 8 facing the cantilever panel. The articulating element passes through insulating body 4, and main body 6 of the articulating element is essentially enclosed in insulating body 4, and end section 8 protrudes into cantilever panel 3. The surface of end section 8 of the articulating element has a positive curvature along the direction of the main axis of cuboid insulating body 4.

Socket joint 29 is also shown with portions 17 protruding above the surface of end section 8 of the articulating element, and which are shaped so that they form a seal between cantilever panel 3 and cuboid insulating body 4. The portions 18 of socket joint 29 that protrude above the surface of end section 8 of the articulating element are also shown beside them, and are surrounded by the cantilever panel. Knob-like elevations 19 protrude into the cantilever panel.

Figure 8:
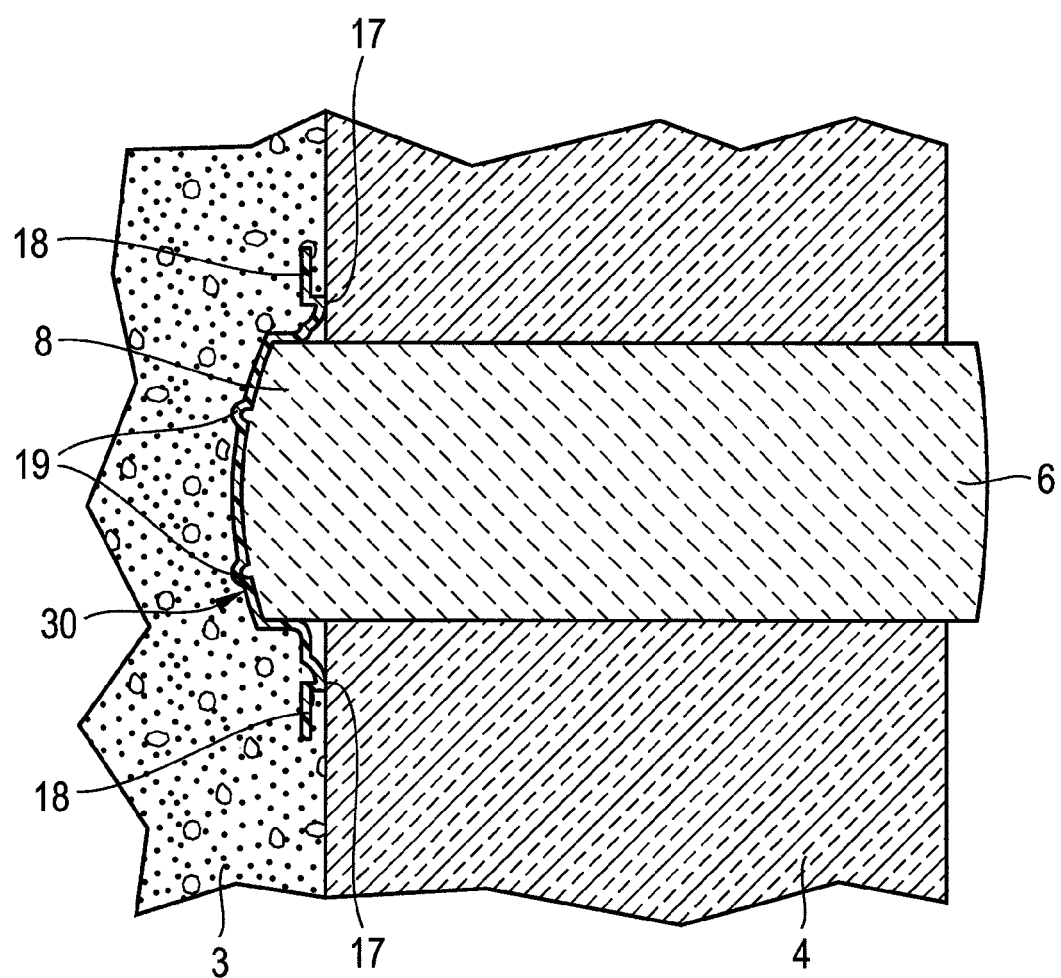
FIG. 8 is a cross section through a cantilever panel connecting element of the present invention with articulating element and socket joint vertically along the main axis of the articulating element.

FIG. 8 shows a cross section through a cantilever panel connecting element of the present invention with articulating element and socket joint vertically along the main axis of the articulating element. The illustrated part of the articulating element includes the main body 6 and the end section 8 facing the cantilever panel. The articulating element passes through cuboid insulating body 4, so that main body 6 of the articulating element is essentially surrounded by cuboid insulating body 4 and end section 8 protrudes into cantilever panel 3. The surface of end section 8 of the articulating element has a positive curvature in the vertical direction, which is however smaller than the curvature in the horizontal direction shown in FIG. 7.

Socket joint 30 is also shown with portions 17 protruding above the surface of end section 8 of the articulating element, and which are shaped so that they form a seal between cantilever panel 3 and cuboid insulating body 4. The portions 18 of socket joint 30 that protrude above the surface of end section 8 of the articulating element are also shown beside them, and are surrounded by the cantilever panel. Knob-like elevations 19 protrude into the cantilever panel.

Figure 9:
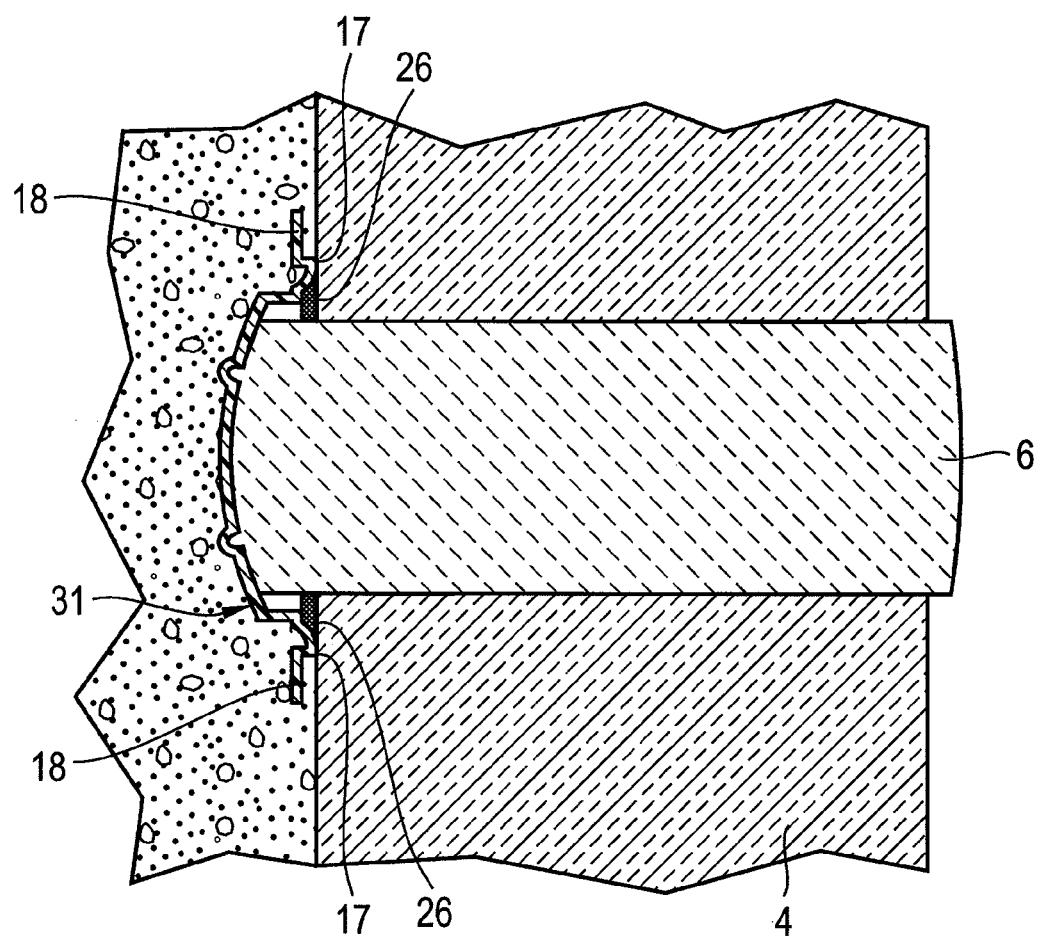
FIG. 9 is a cross section through a cantilever panel connecting element of the present invention with articulating element and socket joint vertically along the main axis of the articulating element.

FIG. 9 shows a cross section through a cantilever panel connecting element of the invention with articulating element and socket joint vertically along the main axis of the articulating element. The illustrated part of the articulating element includes main body 6 and end section 8 facing the cantilever panel. The articulating element passes through insulating body 4, and main body 6 of the articulating element is essentially enclosed in insulating body 4, and end section 8 protrudes into cantilever panel 3. The surface of end section 8 of the articulating element has a positive curvature in the vertical direction, which is however smaller than the curvature in the horizontal direction shown in FIG. 7.

Socket joint 31 is also shown with portions 18 that protrude above the surface of end section 8 of the articulating element, and which are enclosed in the cantilever panel. Portions 17 that protrude above the surface of end section 8 of the articulating element are again shaped such that they form a seal between cantilever panel 3 and cuboid insulating body 4. However, in this embodiment portions 17 represent only a part of the seal between cantilever panel 3 and cuboid insulating body 4. A seal 26 is additionally provided and extends around the articulating element. Seal 26 is produced from an adhesive compound, which prevents concrete slurries from getting into the joint between the insulating body and the main body of the articulating element. The socket joints may also be fixed to articulating element 5 by the adhesive seal for fitting the cantilever panel connecting element. This elastic bond between the socket joint and the articulating element continues to exist even when relative movements between the cantilever panel and the floor/ceiling panel occur. Since the socket joint is permanently bonded to the surrounding concrete, the articulating element is still able to move freely relative to the socket joint.

LEGEND

1 Cantilever panel connecting element
2 Ceiling/floor panel
3 Cantilever panel
4 Insulating body
5 Articulating element
6 Main body of the articulating element
7 End section of the articulating element facing the ceiling/floor panel
8 End section of the articulating element facing the cantilever panel
9,10 Socket joints
11 Internal diameter of the socket joint
12 External diameter of the main body
13, 14, 15, 16 Portions of the socket joints protruding above the surface of the end sections of the articulating element
17 Seal
18 Portions of the socket joint enclosed by the ceiling/floor panel or the cantilever panel
19 Knob-like elevations
20, 21 Cross sections of the main body of the articulating element
22, 23 Sub-elements of the articulating element
24 Contact planes
25 Straight part of the circle segment
26 Seal

The invention claimed is:

1. A cantilever panel connecting (1) assembly for joining a ceiling/floor panel (2) and a cantilever panel (3), comprising:
    at least one tension rod (27) that provides for transference and absorption of horizontal tractive forces;
    at least one traverse rod (28) that provides for transference and absorption of vertical shearing forces;
    pressure means; and
    a cuboid insulating body (4);
    wherein the pressure means is an articulation element (5) that provides for absorption of movement of the cantilever panel relative to the ceiling/floor panel;
    wherein the tension rod (27), traverse rod (28) and articulation element (5) pass through the cuboid insulating body (4);
    wherein the articulation element (5) comprises a main body (6), a first end section (7) facing the floor/ceiling panel, and a second end section (8) facing the cantilever panel, the main body (6) being essentially enclosed in the cuboid insulating body (4), and the first and second end sections (7, 8) respectively protrude into the cantilever panel (3) and into the floor/ceiling panel (2) when fitted;
    wherein a surface of the first and second end sections (7, 8) of the articulation element (5) each have a positive curvature along the main axis of the cuboid insulating body, and the first end section (7, 8) is slidably engaged with a joint socket (9, 10) having an internal diameter that is attached in positive locking manner with the first end section (7, 8);
    wherein the internal diameter (11) of the joint socket (9, 10) is greater than the external diameter (12) of the main body (6) of the articulation element (5).

2. The cantilever panel connecting assembly according to claim 1, characterized in that the internal diameter (11) of the socket joint (9, 10) is at least 1% larger than the external diameter (12) of the main body (6) of the articulation element (5).

3. The cantilever panel connecting assembly according to claim 1, characterized in that the internal diameter (11) of the socket joint (9, 10) is at least 2% larger than the external diameter (12) of the main body (6) of the articulation element (5).

4. The cantilever panel connecting assembly according to claim 1, characterized in that the internal diameter (11) of the socket joint (9, 10) is at least 3% larger than the external diameter (12) of the main body (6) of the articulation element (5).

5. The cantilever panel connecting assembly according to claim 1, characterized in that the internal diameter (11) of the socket joint (9, 10) is at least 5% larger than the external diameter (12) of the main body (6) of the articulation element (5).

6. The cantilever panel connecting assembly according to claim 1, characterized in that the internal diameter (11) of the socket joint (9, 10) is at least 7% larger than the external diameter (12) of the main body (6) of the articulation element (5).

7. The cantilever panel connecting assembly according to claim 1, characterized in that the internal diameter (11) of the socket joint (9, 10) is at least 10% larger than the external diameter (12) of the main body (6) of the articulation element (5).

8. The cantilever panel connecting assembly according to claim 1, characterized in that the internal diameter (11) of the socket joint (9, 10) is at least 15% larger than the external diameter (12) of the main body (6) of the articulation element (5).

9. The cantilever panel connecting assembly according to claim 1, characterized in that the internal diameter (11) of the socket joint (9, 10) is at least 25% larger than the external diameter (12) of the main body (6) of the articulation element (5).

10. The cantilever panel connecting assembly according to any of the preceding claims, characterized in that a surface of the two end sections (7, 8) of the articulation element (5) has a positive curvature in two directions.

11. The cantilever panel connecting assembly according to claim 10, characterized in that the curvatures of the at least one end section (7, 8) of the articulating element (5) are the same size in both directions.

12. The cantilever panel connecting assembly according to claim 1, characterized in that the second end section (7, 8) is furnished with a sliding means.

13. The cantilever panel connecting assembly according to claim 12, characterized in that the coating is a releasing agent that prevents adhesion between concrete and the end section of the articulating element.

14. The cantilever panel connecting assembly according to claim 12, characterized in that an additional sliding means is a further joint socket (9, 10) that is in positive locking arrangement with the second end section (7, 8) of the articulation element (5).

15. The cantilever panel connecting assembly according to claim 14, characterized in that the end sections that are furnished with the joint sockets (9, 10) have a coating that has a lower coefficient of friction than the material of the socket joints.

16. The cantilever panel connecting assembly according to claim 14, characterized in that the joint socket (9, 10) protrudes above the surface of the first or second end section (7, 8) of the articulation element (5), at least in portions (13, 14, 15, 16).

17. The cantilever panel connecting assembly according to claim 16, characterized in that the portions (13, 14, 15, 16) that protrude above the surface of the end section (7, 8) of the articulation element (5) are shaped such that portions thereof form a seal (17) between the ceiling/floor panel (2) and the cuboid insulating body (4) or between the cantilever panel (3) and the cuboid insulating body (4).

18. The cantilever panel connecting assembly according to claim 16, characterized in that the portions (13, 14, 15, 16) that protrude above the surface of the end section (7, 8) of the articulating element (5) are shaped such that portions (18) thereof are surrounded by the ceiling/floor panel (2) or the cantilever panel (3).

19. The cantilever panel connecting assembly according to claim 14, characterized in that the socket joint (9, 10) is furnished with knob elevations (19) at least in portions thereof, which protrude into the ceiling-floor panel (2) and the cantilever panel (3).

20. The cantilever panel connecting assembly according to claim 14, characterized in that the joint socket (9, 10) is constructed from sheet metal, teflon, aluminum, stainless steel, a teflon-coated sheet metal, a film, and/or a teflon-coated film.

21. The cantilever panel connecting assembly according to claim 1, characterized in that the main body (6) has a circular cross section.

22. The cantilever panel connecting assembly according to claim 1, characterized in that the main body (6) has a cross section (20) that is essentially in the shape of a circle segment.

23. The cantilever panel connecting assembly according to claim 1, characterized in that the main body (6) has an essentially rectangular cross section (21), wherein one side of the rectangle is replaced by a circle segment.

24. The cantilever panel connecting assembly according to claim 1, characterized in that the articulating element (5) is made from fiber-reinforced concrete or ceramic.

25. The cantilever panel connecting assembly according to claim 1, characterized in that the articulating element (5) is constructed from at least two sub-elements (22, 23) are in contact with each other via a contact plane and are attached to each other in positive locking manner.

26. The cantilever panel connecting assembly according to claim 25, characterized in that the two sub-elements (22, 23) are essentially identical and the sub-elements have a shared contact plane (24), wherein the contact plane (24) includes the longitudinal axis of the main body of the articulating element.

27. The cantilever panel connecting element according to claim 1, characterized in that a seal (26) is provided that encircles the articulating element (5).

* * * * *